United States Patent
Wu et al.

(10) Patent No.: US 10,206,133 B2
(45) Date of Patent: Feb. 12, 2019

(54) RRM MEASUREMENT METHOD AND APPARATUS IN TDD SYSTEM

(71) Applicant: HUAWEI TECHNOLOGIES CO., LTD., Shenzhen (CN)

(72) Inventors: Tong Wu, Shenzhen (CN); Anjian Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 15/280,002

(22) Filed: Sep. 29, 2016

(65) Prior Publication Data

US 2017/0019810 A1    Jan. 19, 2017

Related U.S. Application Data

(63) Continuation of application No. PCT/CN2014/074757, filed on Apr. 3, 2014.

(51) Int. Cl.
*H04J 3/00* (2006.01)
*H04W 24/10* (2009.01)
(Continued)

(52) U.S. Cl.
CPC .............. *H04W 24/10* (2013.01); *H04L 5/14* (2013.01); *H04W 72/0453* (2013.01)

(58) Field of Classification Search
CPC ................................................... H04W 24/10
See application file for complete search history.

(56) References Cited

U.S. PATENT DOCUMENTS 8,441,951 B2    5/2013  Kazmi et al.
9,628,251 B2 *  4/2017  Lin ........................... H04L 5/14
(Continued)

FOREIGN PATENT DOCUMENTS

CN    101043708    9/2007
CN    102104884    6/2011
(Continued)

OTHER PUBLICATIONS

International Search Report dated Jan. 5, 2015 in corresponding International Application No. PCT/CN2014/074757.
(Continued)

*Primary Examiner* — Gerald A Smarth
(74) *Attorney, Agent, or Firm* — Staas & Halsey LLP

(57) ABSTRACT

The present disclosure provides an RRM measurement method and apparatus in a TDD system, so as to resolve a current problem that in a process of an inter-frequency measurement or an inter-RAT measurement in a TDD system, UE cannot perform an RRM measurement on a cell whose TDD uplink-downlink configuration identifier is 0. In embodiments of the present disclosure, UE performs an RRM measurement on a cell whose TDD uplink-downlink configuration identifier is 0 by using a corresponding RRM measurement method according to measurement indication information that is carried in an RRM measurement message delivered by a network device. By means of the technical solutions in the present disclosure, UE can perform an RRM measurement on a cell whose TDD uplink-downlink configuration identifier is 0 by using an RRM measurement method.

11 Claims, 6 Drawing Sheets

(51) Int. Cl.
*H04L 5/14* (2006.01)
*H04W 72/04* (2009.01)

(56) References Cited

U.S. PATENT DOCUMENTS

| | | | |
|---|---|---|---|
| 2012/0264449 A1 | 10/2012 | Kazmi et al. | |
| 2013/0115985 A1* | 5/2013 | Davydov | H04B 7/024 455/501 |
| 2013/0182583 A1* | 7/2013 | Siomina | H04W 24/10 370/252 |
| 2013/0190006 A1* | 7/2013 | Kazmi | H04W 64/006 455/456.1 |
| 2014/0112180 A1 | 4/2014 | Axmon et al. | |
| 2014/0146696 A1* | 5/2014 | Lin | H04W 72/12 370/252 |

FOREIGN PATENT DOCUMENTS

| | | |
|---|---|---|
| CN | 103067959 A | 4/2013 |
| CN | 103384185 | 11/2013 |
| CN | 103609161 A | 2/2014 |
| CN | 103621138 A | 3/2014 |

| | | | |
|---|---|---|---|
| WO | 2012/175030 A1 | 12/2012 | |

OTHER PUBLICATIONS

International Search Report, dated Jan. 5, 2015, in International Application No. PCT/CN2014/074757 (4 pp.).
*Way forward on RRM requirements for eIMTA*, 3GPP TSG-RAN WG4 Meeting #69, San Francisco, CA, USA, Nov. 11-15, 2013 R4-137155 (3 pp.).
*3rd Generation Partnership Project; Technical Specification Group Radio Access Network; Evolved Universal Terrestrial Radio Access (E-UTRA); Physical channels and modulation (Release 12)*, 3GPP TS 36.211 V12.1.0 (Mar. 2014), pp. 1-120.
*3rd Generation Partnership Project; Technical Specification Group Radio Access Network; Evolved Universal Terrestrial Radio Access (E-UTRA); Radio Resource Control (RRC); Protocol specification (Release 12)*, 3GPP TS 36.331 V12.1.0 (Mar. 2014), pp. 1-356.
*3rd Generation Partnership Project; Technical Specification Group Radio Access Network; Evolved Universal Terrestrial Radio Access (E-UTRA); Requirements for support of radio resource management (Release 12)*, 3GPP TS 36.133 V12.3.0 (Mar. 2014), pp. 1-820.
Chinese Office Action dated Sep. 18, 2018 in corresponding Chinese Patent Application No. 201480000430.1, 5 pgs.

\* cited by examiner

RRM MEASUREMENT METHOD AND APPARATUS IN TDD SYSTEM

CROSS-REFERENCE TO RELATED APPLICATIONS

This application is a continuation of International Application No. PCT/CN2014/074757, filed on Apr. 3, 2014, the disclosure of which is hereby incorporated by reference in its entirety.

TECHNICAL FIELD

The present disclosure relates to the field of communications technologies, and in particular, to an RRM measurement method and apparatus in a TDD system.

BACKGROUND

Currently, a time division long term evolution (TD-LTE) network attracts much attention because of various advantages of the TD-LTE network such as a high data transmission rate, high spectrum efficiency, and flexible spectrum allocation.

Referring to Table 1, Table 1 shows seven uplink-downlink subframe configuration manners that correspond to an LTE network in a TDD system.

In the TD-LTE network, duration corresponding to each subframe is one millisecond. Referring to Table 1, the TDD uplink-downlink configuration 0 includes a smallest quantity of downlink subframes, that is, only two downlink subframes are included in a subframe 0 to a subframe 9; and it can be known from Table 1 that each downlink-to-uplink switch-point periodicity (which is five milliseconds) includes only one downlink subframe.

In an LTE system, a user terminal needs to perform radio resource management (RRM) such as an intra-frequency measurement, an inter-frequency measurement, or an inter-RAT measurement. In a process of the intra-frequency measurement, because a to-be-measured center frequency corresponding to user equipment (UE) does not change, a connection to an original serving cell does not need to be disrupted. However, in a process of the inter-frequency measurement or the inter-RAT measurement, because a to-be-measured center frequency corresponding to the UE deviates, a user needs a "gap" period, which is referred to as a Gap. In the Gap, the connection to the original serving cell is disrupted, a frequency channel number is adjusted to be on a target center frequency, a measurement is performed on the target center frequency, and an adjustment back to the original center frequency is performed when the Gap ends. Currently, Gap types supported by the LTE network are shown in Table 2.

TABLE 1

Uplink-downlink configuration of a TDD system

| Uplink-downlink configuration number | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D |

In Table 1, 0 to 6 represent seven different configuration identifiers, U represents an uplink subframe, D represents a downlink subframe, and S represents a special subframe used to complete switching between an uplink subframe and a downlink subframe.

TABLE 2

Gap types supported by an LTE user terminal

| Gap Pattern ID | Measurement Gap length (MGL, ms) | Measurement Gap repetition period (MGRP, ms) | Minimum available time for an inter-frequency measurement or inter-RAT measurement during 480 ms period (Tinter1, ms) | Measurement purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

The Gaps shown in Table 2 above are applicable to both an FDD-LTE system and a TDD-LTE system. Specifically, both the FDD-LTE system and the TDD-LTE system have a measurement Gap length of six ms, but different systems correspond to different repetition periods.

In a process of an inter-frequency measurement or an inter-RAT measurement, in the six ms corresponding to the foregoing Gap, there is approximately one ms for UE to perform a radio frequency adjustment (a center frequency adjustment, or the like), and the remaining five ms is used for the UE to perform an inter-frequency measurement or an inter-RAT measurement. For the TDD system, the five ms for the inter-frequency measurement is further limited, as shown in Table 3.

TABLE 3

Quantity of uplink/downlink subframes needed by a TDD -LTE system having different Gap configurations

| Configuration | Measurement bandwidth [RB] | Number of uplink/downlink subframes per half frame (5 ms) | | Downlink pilot timeslot (DwPTS) | | Inter-frequency measurement period of an LTE time division duplex system |
| --- | --- | --- | --- | --- | --- | --- |
| | | DL | UL | Normal CP | Extended CP | ($T_{Measurement\_Period\_TDD\_Inter}$ [ms]) |
| 0 | 6 | 2 | 2 | $19760 \cdot T_s$ | $20480 \cdot T_s$ | 480 × Nfreq |
| 1 (Note 1) | 50 | 2 | 2 | $19760 \cdot T_s$ | $20480 \cdot T_s$ | 240 × Nfreq |

(Note 1):
This configuration is optional
Note 2:
Ts is defined in 3GPP TS 36.211 [16]

It can be known from Table 3 that regardless of a value of a bandwidth during a TDD measurement, two downlink subframes are needed in every five ms to satisfy an RRM measurement requirement. However, in the TDD uplink-downlink configuration 0, there is only one downlink subframe in every five ms. Therefore, a current RRM measurement requirement is not applicable to the TDD uplink-downlink configuration 0, and consequently, the UE cannot perform an RRM measurement on a cell whose TDD uplink-downlink configuration identifier is 0.

To sum up, currently there exists a problem that in a process of an inter-frequency measurement or an inter-RAT measurement in a TDD system, UE cannot perform an RRM measurement on a cell whose TDD uplink-downlink configuration identifier is 0.

SUMMARY

Embodiments of the present disclosure provide an RRM measurement method and apparatus in a TDD system, so as to resolve a current problem that in a process of an inter-frequency measurement or an inter-RAT measurement in a TDD system, UE cannot perform an RRM measurement on a cell whose TDD uplink-downlink configuration identifier is 0.

According to a first aspect, an RRM measurement method in a TDD system is provided, including:

receiving an RRM measurement message delivered by a network device; and performing an RRM measurement on a cell whose TDD uplink-downlink configuration identifier is 0 in an RRM measurement manner that corresponds to measurement indication information carried in the received RRM measurement message.

With reference to the first aspect, in a first possible implementation manner, the method includes: when the measurement indication information carried in the RRM measurement message is bandwidth measurement indication information, performing an RRM measurement on the cell whose TDD uplink-downlink configuration identifier is 0 by using a preset measurement bandwidth, where the preset measurement bandwidth is greater than a preset threshold; or when the measurement indication information carried in the RRM measurement message is period measurement indication information, performing an RRM measurement on the cell whose TDD uplink-downlink configuration identifier is 0 by using a preset measurement period.

With reference to the first possible implementation manner of the first aspect, in a second possible implementation manner, when the measurement indication information carried in the RRM measurement message is the period measurement indication information, if a measurement bandwidth is six RBs, the used preset measurement period is greater than 480 milliseconds and is less than 960 milliseconds; or if a measurement bandwidth is 50 RBs, the used preset measurement period is greater than 240 milliseconds and is less than 720 milliseconds.

With reference to the second possible implementation manner of the first aspect, in a third possible implementation manner, if the measurement bandwidth is 6 RBs, the used preset measurement period is 720 milliseconds; or if the measurement bandwidth is 50 RBs, the used preset measurement period is 480 milliseconds.

With reference to the first possible implementation manner of the first aspect, in a fourth possible implementation manner, the method includes: when the measurement indication information carried in the RRM measurement message is the bandwidth measurement indication information, receiving an explicit RRM measurement message delivered by the network device, where the explicit RRM measurement message carries TDD interference management and traffic adaptation eIMTA indication information and a bandwidth measurement indication, or receiving an implicit RRM measurement message delivered by the network device, where the implicit RRM measurement message carries eIMTA indication information.

With reference to the fourth possible implementation manner of the first aspect, in a fifth possible implementation manner, the method includes: when the RRM measurement message is the explicit RRM measurement message, obtaining, according to the eIMTA indication information, an identifier of the cell whose TDD uplink-downlink configuration identifier is 0, and obtaining bandwidth measurement indication information according to the bandwidth measurement indication; or when the RRM measurement message is the implicit RRM measurement message, obtaining identifier information that is included in the eIMTA indication information carried in the implicit RRM measurement message, and obtaining, according to the identifier information, bandwidth measurement indication information corresponding to the identifier information and an identifier of the cell whose TDD uplink-downlink configuration identifier is 0.

With reference to the first aspect, in a sixth possible implementation manner, the method includes: performing an RRM measurement on the cell whose TDD uplink-downlink configuration identifier is 0 by using a preset measurement Gap repetition period according to the measurement indication information, where the preset measurement Gap repetition period is greater than 10 milliseconds and is less than 40 milliseconds; or performing an RRM measurement on the cell whose TDD uplink-downlink configuration identifier is 0 by using a preset measurement Gap length according to the measurement indication information, where the preset measurement Gap length is greater than 6 milliseconds and is less than 16 milliseconds; or performing an RRM measurement on the cell whose TDD uplink-downlink configuration identifier is 0 by using a preset cell search boundary parameter, where the preset cell search boundary parameter is greater than −6 dB.

With reference to the sixth possible implementation manner of the first aspect, in a seventh possible implementation manner, the method includes: performing an RRM measurement on the cell whose TDD uplink-downlink configuration identifier is 0 by using a preset measurement Gap repetition period according to the measurement indication information, where the preset measurement Gap repetition period is 20 milliseconds; or performing an RRM measurement on the cell whose TDD uplink-downlink configuration identifier is 0 by using a preset measurement Gap length according to the measurement indication information, where the preset measurement Gap length is 11 milliseconds; or performing an RRM measurement on the cell whose TDD uplink-downlink configuration identifier is 0 by using a preset cell search boundary parameter, where the preset cell search boundary parameter is −3 dB.

According to a second aspect, an RRM measurement method in a TDD system is provided, including:

sending an RRM measurement message to user equipment UE; and instructing the UE to perform, in an RRM measurement manner that corresponds to measurement indication information carried in the RRM measurement message, an RRM measurement on a cell whose TDD uplink-downlink configuration identifier is 0.

With reference to the second aspect, in a first possible implementation manner, the method includes: sending, to the UE, an RRM measurement message carrying bandwidth measurement indication information; or sending, to the UE, an RRM measurement message carrying period measurement indication information.

With reference to the first possible implementation manner of the second aspect, in a second possible implementation manner, the method includes: sending an explicit RRM measurement message to the UE, where the explicit RRM measurement message carries eIMTA indication information and a bandwidth measurement indication; or sending an implicit RRM measurement message to the UE, where the implicit RRM measurement message carries eIMTA indication information.

According to a third aspect, an RRM measurement apparatus in a TDD system is provided, including:

a receiving unit, configured to receive an RRM measurement message delivered by a network device, and send the RRM measurement message to a measurement unit; and the measurement unit, configured to receive the RRM measurement message sent by the receiving unit, and perform an RRM measurement on a cell whose TDD uplink-downlink configuration identifier is 0 in an RRM measurement manner that corresponds to measurement indication information carried in the received RRM measurement message.

With reference to the third aspect, in a first possible implementation manner, the measurement unit is configured to: when the measurement indication information carried in the RRM measurement message is bandwidth measurement indication information, perform an RRM measurement on the cell whose TDD uplink-downlink configuration identifier is 0 by using a preset measurement bandwidth, where the preset measurement bandwidth is greater than a preset threshold; or when the measurement indication information carried in the RRM measurement message is period measurement indication information, perform an RRM measurement on the cell whose TDD uplink-downlink configuration identifier is 0 by using a preset measurement period.

With reference to the first possible implementation manner of the third aspect, in a second possible implementation manner, the measurement unit is configured to: when the measurement indication information carried in the RRM measurement message is the period measurement indication information, if a measurement bandwidth is six radio resource blocks RBs, use a preset measurement period greater than 480 milliseconds and less than 960 milliseconds; or if a measurement bandwidth is 50 RBs, use a preset measurement period greater than 240 milliseconds and less than 720 milliseconds.

With reference to the second possible implementation manner of the third aspect, in a third possible implementation manner, the measurement unit is configured to: if the measurement bandwidth is 6 radio resource blocks RBs, use a preset measurement period of 720 milliseconds; or if the measurement bandwidth is 50 RBs, use a preset measurement period of 480 milliseconds.

With reference to the first possible implementation manner of the third aspect, in a fourth possible implementation manner, the receiving unit is configured to: when the measurement indication information carried in the RRM measurement message is the bandwidth measurement indication information, receive an explicit RRM measurement message delivered by the network device, where the explicit RRM measurement message carries TDD interference management and traffic adaptation eIMTA indication information and a bandwidth measurement indication, or receive an implicit RRM measurement message delivered by the network device, where the implicit RRM measurement message carries eIMTA indication information.

With reference to the fourth possible implementation manner of the third aspect, in a fifth possible implementation manner, the measurement unit is configured to: when the RRM measurement message is the explicit RRM measurement message, obtain, according to the eIMTA indication information, an identifier of the cell whose TDD uplink-downlink configuration identifier is 0, and obtain bandwidth measurement indication information according to the bandwidth measurement indication; or when the RRM measurement message is the implicit RRM measurement message, obtain identifier information that is included in the eIMTA indication information carried in the implicit RRM measurement message, and obtain, according to the identifier information, bandwidth measurement indication information corresponding to the identifier information and an identifier of the cell whose TDD uplink-downlink configuration identifier is 0.

With reference to the third aspect, in a sixth possible implementation manner, the measurement unit is configured to: perform an RRM measurement on the cell whose TDD uplink-downlink configuration identifier is 0 by using a preset measurement Gap repetition period according to the measurement indication information, where the preset measurement Gap repetition period is greater than 10 milliseconds and is less than 40 milliseconds; or perform an RRM measurement on the cell whose TDD uplink-downlink configuration identifier is 0 by using a preset measurement Gap length according to the measurement indication information, where the preset measurement Gap length is greater than 6 milliseconds and is less than 16 milliseconds; or perform an RRM measurement on the cell whose TDD uplink-downlink configuration identifier is 0 by using a preset cell search boundary parameter, where the preset cell search boundary parameter is greater than −6 dB.

With reference to the sixth possible implementation manner of the third aspect, in a seventh possible implementation manner, the measurement unit is configured to perform an RRM measurement on the cell whose TDD uplink-downlink configuration identifier is 0 by using a preset measurement Gap repetition period according to the measurement indication information, where the preset measurement Gap repetition period is 20 milliseconds; or perform an RRM measurement on the cell whose TDD uplink-downlink configuration identifier is 0 by using a preset measurement Gap length according to the measurement indication information, where the preset measurement Gap length is 11 milliseconds; or perform an RRM measurement on the cell whose TDD uplink-downlink configuration identifier is 0 by using a preset cell search boundary parameter, where the preset cell search boundary parameter is −3 dB.

According to a fourth aspect, a radio resource management RRM measurement apparatus in a time division duplex TDD system includes:

a sending unit, configured to send an RRM measurement message to user equipment UE; and an indication unit, configured to instruct the UE to perform, in an RRM measurement manner that corresponds to measurement indication information carried in the RRM measurement message, an RRM measurement on a cell whose TDD uplink-downlink configuration identifier is 0.

With reference to the fourth aspect, in a first possible implementation manner, the sending unit is configured to: send, to the UE, an RRM measurement message carrying bandwidth measurement indication information; or send, to the UE, an RRM measurement message carrying period measurement indication information.

With reference to the first possible implementation manner of the fourth aspect, in a second possible implementation manner, the sending unit is configured to: send an explicit RRM measurement message to the UE, where the explicit RRM measurement message carries eIMTA indication information and a bandwidth measurement indication; or send an implicit RRM measurement message to the UE, where the implicit RRM measurement message carries eIMTA indication information.

In the embodiments of the present disclosure, UE performs an RRM measurement on a cell whose TDD uplink-downlink configuration identifier is 0 by using a corresponding RRM measurement method according to measurement indication information that is carried in an RRM measurement message delivered by a network device. By means of the technical solutions in the present disclosure, UE can perform an RRM measurement on a cell whose TDD uplink-downlink configuration identifier is 0 by using an RRM measurement method.

DESCRIPTION OF EMBODIMENTS

In order to resolve a current problem that in a process of an inter-frequency measurement or an inter-RAT measurement in a TDD system, UE cannot perform an RRM measurement on a cell whose TDD uplink-downlink configuration identifier is 0, in the embodiments of the present disclosure, UE performs an RRM measurement on a cell whose TDD uplink-downlink configuration identifier is 0 by using a corresponding RRM measurement method according to measurement indication information that is carried in an RRM measurement message delivered by a network device. By means of the technical solutions in the present disclosure, UE can perform an RRM measurement on a cell whose TDD uplink-downlink configuration identifier is 0 by using an RRM measurement method.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The following further describes the embodiments of the present disclosure in detail with reference to the accompanying drawings in this specification.

Figure 1:
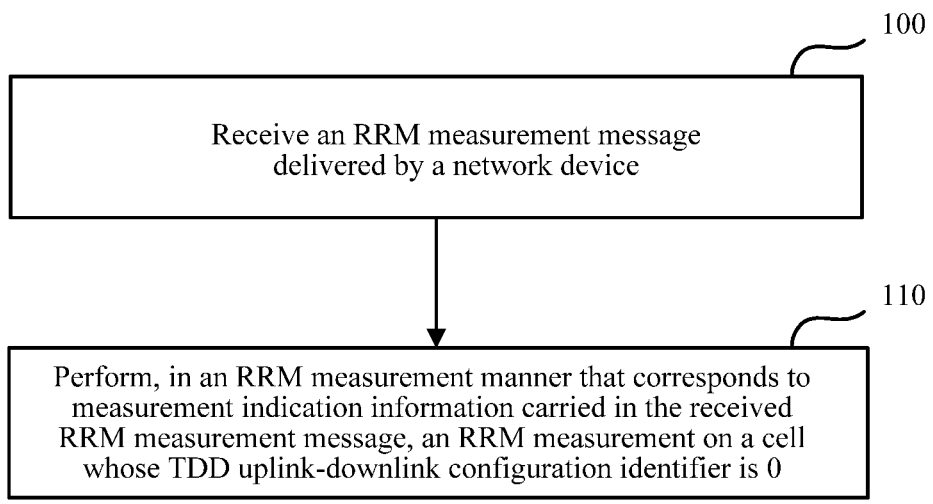
FIG. 1 is a flowchart of performing an RRM measurement by UE according to an embodiment of the present disclosure.

Referring to FIG. 1, in an embodiment of the present disclosure, in a process of an inter-frequency measurement or an inter-RAT measurement in a TDD system, a process of performing an RRM measurement by UE is:

Step 100: Receive an RRM measurement message delivered by a network device.

In this embodiment of the present disclosure, the UE receives the RRM measurement message delivered by the network device, and obtains measurement indication information carried in the RRM measurement message, where the measurement indication information may be bandwidth measurement indication information, or the measurement indication information may be period measurement indication information. The network device is a device having an RRM function, including a macro base station, a home eNodeB, a micro base station, a relay device, or the like.

Optionally, when the measurement indication information is bandwidth measurement indication information, the UE receives an explicit RRM measurement message delivered by the network device, where the explicit RRM measurement message carries 1-bit eIMTA (Further Enhancements to LTE TDD for DL-UL Interference Management and Traffic Adaptation, TDD interference management and traffic adaptation) indication information and a 1-bit bandwidth measurement indication. The eIMTA indication information is used to indicate an identifier of a cell whose TDD uplink-downlink configuration identifier is 0; and the bandwidth measurement indication is used to indicate a manner in which the UE performs an RRM measurement. Alternatively, when the measurement indication information is bandwidth measurement indication information, the UE receives an implicit RRM measurement message delivered by the network device, where the implicit RRM measurement message carries 1-bit eIMTA indication information, which is used to indicate an identifier of a cell whose TDD uplink-downlink configuration identifier is 0.

Step 110: Perform an RRM measurement on a cell whose TDD uplink-downlink configuration identifier is 0 in an RRM measurement manner that corresponds to measurement indication information carried in the received RRM measurement message.

In this embodiment of the present disclosure, based on different content carried in the foregoing RRM measurement message, the UE uses different RRM measurement manners, which are specifically:

When the measurement indication information carried in the RRM measurement message is bandwidth measurement indication information, an RRM measurement is performed on the cell whose TDD uplink-downlink configuration identifier is 0 by using a preset measurement bandwidth, where the preset measurement bandwidth is greater than a preset threshold. According to measurement bandwidths shown in Table 3, the foregoing preset threshold is set to 25 radio resource blocks (25 RBs) or 50 RBs. Optionally, the foregoing preset measurement bandwidth is stored in the UE. After parsing out the bandwidth measurement indication information, the UE performs an RRM measurement on the cell whose TDD uplink-downlink configuration identifier is 0 by using the preset measurement bandwidth stored in the UE. In addition, the foregoing bandwidth measurement indication may also include a bandwidth measurement indication, and the UE performs an RRM measurement on the cell whose TDD uplink-downlink configuration identifier is 0 according to the bandwidth measurement indication (such as an Allow Meas Bandwidth).

When the foregoing RRM measurement message is the explicit RRM measurement message, a process of obtaining the bandwidth measurement indication information by the UE is: obtaining, according to the eIMTA indication information, the identifier of the cell whose TDD uplink-downlink configuration identifier is 0, and obtaining bandwidth measurement indication information according to the bandwidth measurement indication; or when the RRM measurement message is the implicit RRM measurement message, a process of obtaining the bandwidth measurement indication information by the UE is: obtaining identifier information that is included in the eIMTA indication information carried in the implicit RRM measurement message, and obtaining, according to the identifier information, bandwidth measurement indication information corresponding to the identifier information and the identifier of the cell whose TDD uplink-downlink configuration identifier is 0.

Generally, to reduce power consumption of the UE, the UE uses 6 RBs to perform an RRM measurement, on the premise that there are at least two downlink subframes in every five milliseconds. However, when a TDD uplink-downlink configuration is 0, there are relatively few downlink subframes. By means of the foregoing technical solution, the UE obtains sufficient samples of cell-specific reference signals (CRSs) by increasing a measurement bandwidth, so that the UE can perform an RRM measurement on a cell whose TDD uplink-downlink configuration identifier is 0, and measurement accuracy required by a standard is satisfied.

When the measurement indication information carried in the RRM measurement message is period measurement indication information, an RRM measurement is performed on the cell whose TDD uplink-downlink configuration identifier is 0 by using a preset measurement period, where the foregoing preset measurement period is greater than an RRM measurement period corresponding to another TDD uplink-downlink configuration identifier (that is, the preset measurement period is greater than an RRM measurement period specified in the standard TS 36.133). Specifically, in a process of an inter-frequency measurement or an inter-RAT measurement, when a measurement bandwidth is six radio resource blocks (6 RBs), for an inter-frequency or inter-system frequency channel number, a preset measurement period is greater than 480 milliseconds and less than 960 milliseconds, and preferably, the preset measurement period is 720 milliseconds; or when a measurement bandwidth is 50 RBs, for an inter-frequency or inter-system frequency channel number, a preset measurement period is greater than 240 milliseconds and less than 720 milliseconds, and preferably, the preset measurement period is 480 milliseconds. It is unnecessary to set a measurement period for the measurement bandwidths between 6 RBs and 50 RBs, and the UE may perform an RRM measurement on the cell whose TDD uplink-downlink configuration identifier is 0 by using a preset measurement period corresponding to either of the measurement bandwidths 6 RBs and 50 RBs.

The existing standard TS 36.133 requires that when UE in a TD-LTE network performs an inter-frequency measurement or inter-RAT measurement, if a measurement bandwidth is 6 RBs, an RRM measurement period of a measurement performed by the UE on each inter-frequency or inter-system frequency channel number is 480 ms; or if a measurement bandwidth is 50 RBs, an RRM measurement period of a measurement performed by the UE on each inter-frequency or inter-system frequency channel number is 240 ms. Based on this, by means of the foregoing technical solution, by prolonging duration of a measurement period, it is ensured that the UE can obtain a sufficient quantity of downlink subframes within the measurement period, thereby ensuring a quantity of samples obtained during an RRM measurement and accuracy of an RRM measurement result.

Optionally, when the network device uses radio resource control (RRC) signaling to indicate, to the UE, a TDD uplink-downlink configuration identifier of an inter-frequency or inter-system neighboring cell needing to be measured by the UE, an RRM measurement is performed by using the foregoing preset measurement period; or when the network device does not use RRC signaling to indicate, to the UE, a TDD uplink-downlink configuration identifier of an inter-frequency or inter-system neighboring cell needing to be measured by the UE, an RRM measurement is performed by using a measurement period specified in the existing standard TS36.133.

Further, the UE may further perform an RRM measurement on the cell whose TDD uplink-downlink configuration identifier is 0 in the following RRM measurement manners:

In a first manner, an RRM measurement is performed on the cell whose TDD uplink-downlink configuration identifier is 0 by using a preset measurement Gap repetition period according to the measurement indication information carried in the RRM measurement message, where the preset measurement Gap repetition period is less than a measurement Gap repetition period that is set in a current LTE system for an inter-frequency measurement, and the preset measurement Gap repetition period is less than a measurement Gap repetition period that is specified in the standard TS 36.133 of the 3rd Generation Partnership Project (3GPP). The preset measurement Gap repetition period is greater than 10 milliseconds and is less than 40 milliseconds, and preferably, the preset measurement Gap repetition period is 20 milliseconds. By means of the foregoing technical solution, a new measurement form is introduced, so that within a same time, the TDD uplink-downlink configuration 0 has a same quantity of downlink subframes as another uplink-downlink configuration identifier, thereby implementing an RRM measurement by UE on a cell whose TDD uplink-downlink configuration identifier is 0.

In a second manner, an RRM measurement is performed on the cell whose TDD uplink-downlink configuration identifier is 0 by using a preset measurement Gap length according to the measurement indication information carried in the RRM measurement message, where the preset measurement Gap length is greater than a measurement Gap length specified in the standard TS 36.133. The preset measurement Gap length is greater than 6 milliseconds and is less than 16 milliseconds, and preferably, the preset measurement Gap length is 11 milliseconds. By means of the foregoing technical solution, a new measurement form is introduced, so that within a same time, the TDD uplink-downlink configuration 0 has a same quantity of downlink subframes as another uplink-downlink configuration identifier, thereby implementing an RRM measurement by UE on a cell whose TDD uplink-downlink configuration identifier is 0.

In the foregoing two RRM measurement manners, the first RRM measurement manner is better than the second RRM measurement manner. In addition, the UE can also perform an RRM measurement by using a combination of the foregoing two RRM measurement manners, that is, the UE performs an RRM measurement on the cell whose TDD uplink-downlink configuration identifier is 0 by using the preset measurement Gap repetition period and the preset measurement Gap length according to the measurement indication information carried in the RRM measurement message.

In a third manner, an RRM measurement is performed on the cell whose TDD uplink-downlink configuration identifier is 0 by using a preset cell search boundary parameter according to the measurement indication information carried in the RRM measurement message, where the preset cell search boundary parameter is greater than a cell search boundary parameter specified in the standard TS 36.133. The preset cell search boundary parameter is greater than −6 dB, and preferably, the preset cell search boundary parameter is greater than −3 dB. By means of the foregoing technical solution, by changing a search boundary condition of an existing standard, RRM measurement accuracy is ensured while an RRM measurement on a cell whose TDD uplink-downlink configuration identifier is 0 is implemented.

In addition, the UE may further perform an RRM measurement on the cell whose TDD uplink-downlink configuration identifier is 0 in a manner of reducing accuracy of an RRM measurement result.

Figure 2:
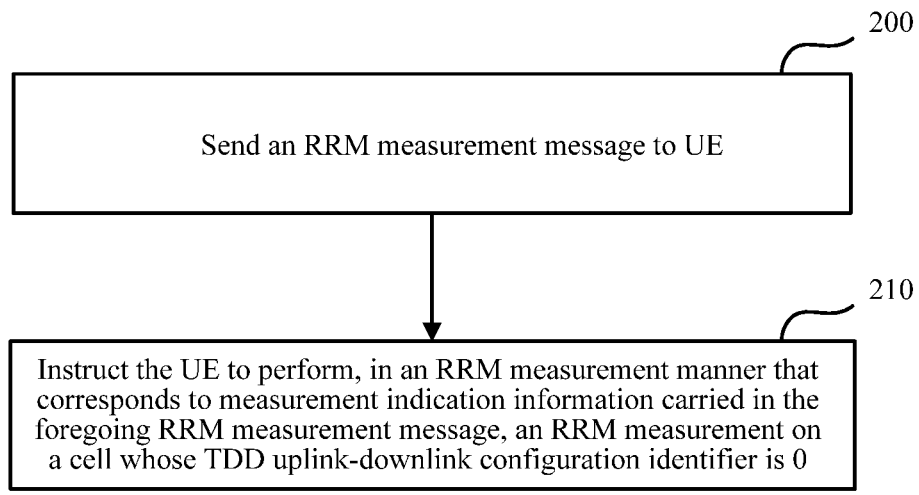
FIG. 2 is a flowchart of instructing, by a network device, UE to perform an RRM measurement according to an embodiment of the present disclosure.

Referring to FIG. 2, FIG. 2 corresponds to the method shown in FIG. 1 above. A process in which a network device in a TDD system instructs UE to perform an RRM measurement includes:

Step 200: Send an RRM measurement message to UE.

In this embodiment of the present disclosure, when detecting that UE accessing any cell performs an RRM measurement, a network device determines that there is a cell whose TDD uplink-downlink configuration identifier is 0 in all neighboring cells of the cell, and then the network device generates an RRM measurement message based on an identifier of the cell whose TDD uplink-downlink configuration identifier is 0, and sends the RRM measurement message to the UE. The foregoing RRM measurement message carries bandwidth measurement indication information; or the foregoing RRM measurement message is an RRM measurement message carrying period measurement indication information. The network device is a device having an RRM function, including a macro base station, a home eNodeB, a micro base station, a relay device, or the like.

The network device may send, to the UE, an RRM measurement message carrying bandwidth measurement indication information in two manners, which are specifically: sending, by the network device, an explicit RRM measurement message to the UE, where the explicit RRM measurement message carries eIMTA indication information and a bandwidth measurement indication, the eIMTA indication information is used to indicate an identifier of a cell whose TDD uplink-downlink configuration identifier is 0, and the bandwidth measurement indication is used to indicate a manner in which the UE performs an RRM measurement; or sending, by the network device, an implicit RRM measurement message to the UE, where the implicit RRM measurement message carries eIMTA indication information, which is used to indicate an identifier of a cell whose TDD uplink-downlink configuration identifier is 0.

Step 210: Instruct the UE to perform, in an RRM measurement manner that corresponds to measurement indication information carried in the foregoing RRM measurement message, an RRM measurement on a cell whose TDD uplink-downlink configuration identifier is 0.

In this embodiment of the present disclosure, a network device instructs UE to obtain, according to an RRM measurement message, a corresponding RRM measurement manner, and perform an RRM measurement on a cell whose TDD uplink-downlink configuration identifier is 0.

Based on the foregoing technical solution, the following describes a process of an RRM measurement in a TDD system in detail with reference to a specific application scenario.

Implementation Manner 1

Figure 3:
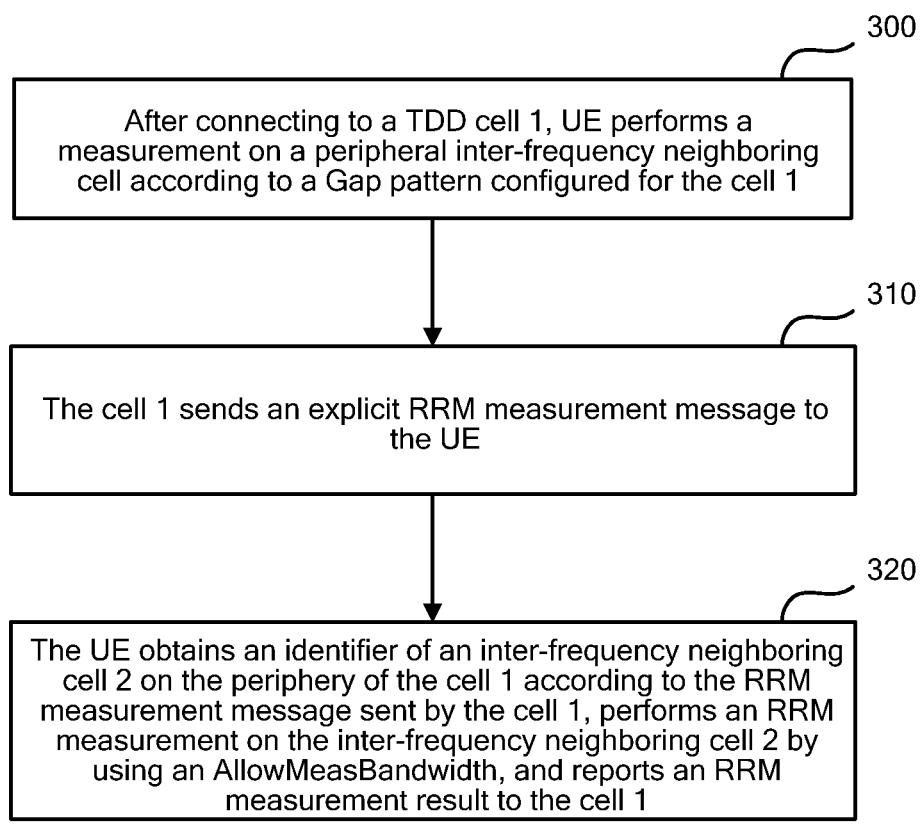
FIG. 3 is a flowchart 1 of performing an RRM measurement by UE in a specific application scenario according to an embodiment of the present disclosure.
Figure 4:
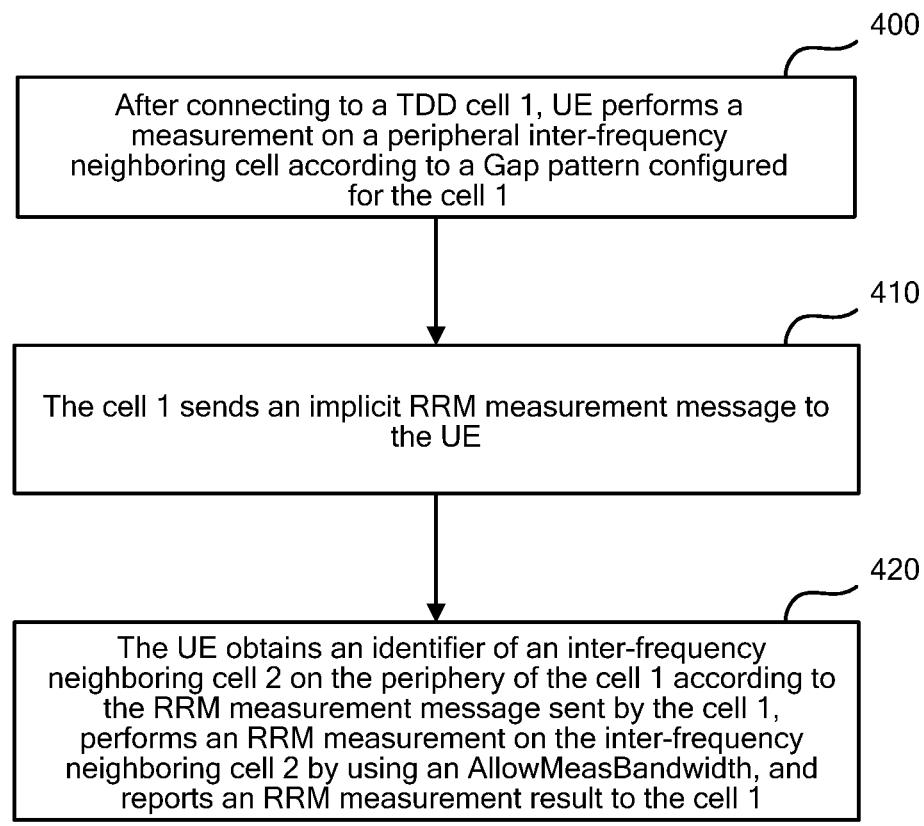
FIG. 4 is a flowchart 2 of performing an RRM measurement by UE in a specific application scenario according to an embodiment of the present disclosure.

In this embodiment of the present disclosure, an example in which UE accesses a TDD cell 1, a TDD cell 2 is an inter-frequency neighboring cell of the cell 1, the cell 1 and the cell 2 exchange information by using an interface X2, a TDD uplink-downlink configuration identifier of the cell 1 is 1, and a TDD uplink-downlink configuration identifier of the cell 2 is 0 is used. When an RRM measurement is performed according to bandwidth measurement indication information, referring to FIG. 3 and FIG. 4, a processing of performing an RRM measurement on the cell 2 by the UE is:

Option 1: A network device delivers an explicit RRM measurement message.

Step 300: After connecting to the TDD cell 1, the UE performs a measurement on a peripheral inter-frequency neighboring cell according to a Gap pattern configured for the cell 1.

Step 310: The cell 1 sends an explicit RRM measurement message to the UE.

In this embodiment of the present disclosure, the foregoing RRM measurement message includes 1-bit eIMTA indication information (or referred to as a "dynamic TDD" indication), and a 1-bit bandwidth measurement indication; an "allowed measurement bandwidth" (AllowMeasBandwidth) is delivered, to instruct the UE to perform, by using the AllowMeasBandwidth, an RRM measurement on a neighboring cell of the cell 1. The RRM measurement includes a reference signal received power (RSRP) measurement and a reference signal received quality (RSRQ) measurement.

Step 320: The UE obtains an identifier of the inter-frequency neighboring cell 2 on the periphery of the cell 1 according to the RRM measurement message sent by the cell 1, performs an RRM measurement on the inter-frequency neighboring cell 2 by using an AllowMeasBandwidth, and reports an RRM measurement result to the cell 1.

Option 2: A network device delivers an implicit RRM measurement message.

Step 400: After connecting to the TDD cell 1, the UE performs a measurement on a peripheral inter-frequency neighboring cell according to a Gap pattern configured for the cell 1.

Step 410: The cell 1 sends an implicit RRM measurement message to the UE.

In this embodiment of the present disclosure, the foregoing RRM measurement message includes 1-bit eIMTA indication information (or referred to as a "dynamic TDD" indication), and an "Allow Measurement Bandwidth" (AllowMeasBandwidth) is delivered, to instruct the UE to perform, by using the AllowMeasBandwidth, an RRM measurement on a neighboring cell of the cell 1. The RRM measurement includes an RSRP measurement and an RSRQ measurement.

Step 420: The UE obtains an identifier of the inter-frequency neighboring cell 2 on the periphery of the cell 1 according to the RRM measurement message sent by the cell 1, performs an RRM measurement on the inter-frequency neighboring cell 2 by using an AllowMeasBandwidth, and reports an RRM measurement result to the cell 1.

Generally, to reduce power consumption of the UE, the UE uses 6 RBs to perform an RRM measurement, on the premise that there are at least two downlink subframes in every five milliseconds. However, when a TDD uplink-downlink configuration is 0, there are relatively few downlink subframes. By means of the foregoing technical solution, the UE obtains sufficient samples of CRSs by increasing a measurement bandwidth, so that the UE can perform an RRM measurement on a cell whose TDD uplink-downlink configuration identifier is 0, and measurement accuracy required by a standard is satisfied.

Implementation Manner 2

Figure 5:
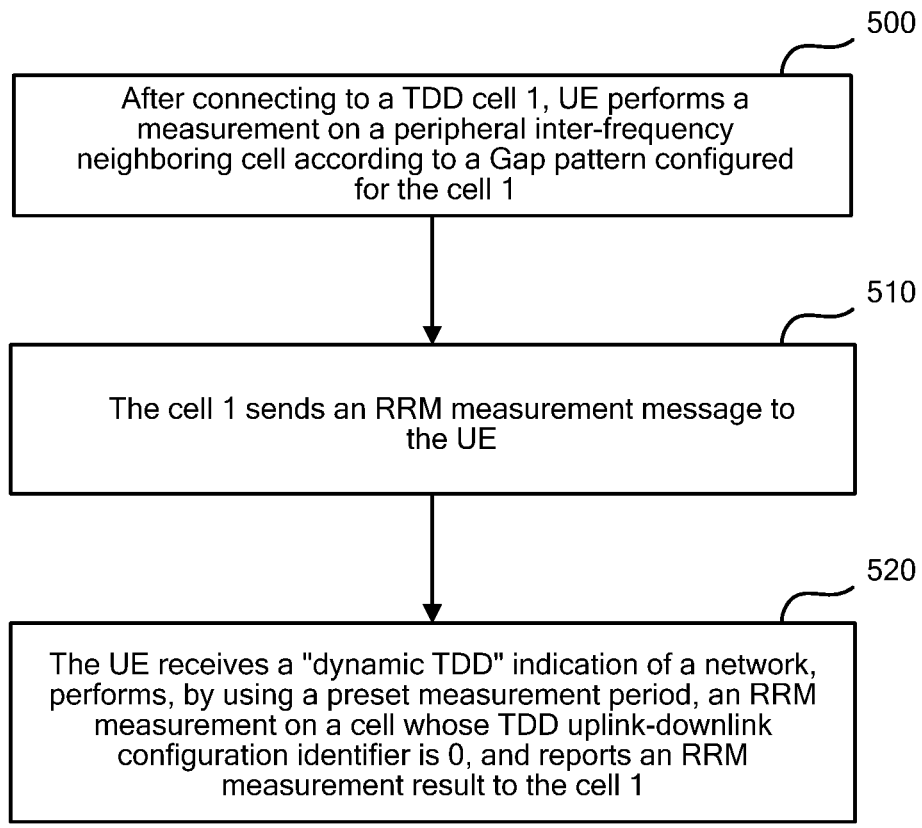
FIG. 5 is a flowchart 3 of performing an RRM measurement by UE in a specific application scenario according to an embodiment of the present disclosure.

In this embodiment of the present disclosure, an example in which UE accesses a TDD cell 1, a TDD cell 2 is an inter-frequency neighboring cell of the cell 1, the cell 1 and the cell 2 exchange information by using an interface X2, a TDD uplink-downlink configuration identifier of the cell 1 is 1, and a TDD uplink-downlink configuration identifier of the cell 2 is 0 is used. When an RRM measurement is performed according to period measurement indication information, referring to FIG. 5, a processing of performing an RRM measurement on the cell 2 by the UE is:

Step 500: After connecting to the TDD cell 1, the UE performs a measurement on a peripheral inter-frequency neighboring cell according to a Gap pattern configured for the cell 1.

Step 510: The cell 1 sends an RRM measurement message to the UE.

In this embodiment of the present disclosure, the foregoing RRM measurement message includes 1-bit eIMTA indication information (or referred to as a "dynamic TDD" indication), to indicate that a cell whose TDD uplink-downlink configuration identifier is 0 exists in neighboring cells of the cell 1. The RRM measurement includes an RSRP measurement and an RSRQ measurement.

Step 520: The UE receives a "dynamic TDD" indication of a network, performs an RRM measurement on a cell whose TDD uplink-downlink configuration identifier is 0 by using a preset measurement period, and reports an RRM measurement result to the cell 1.

In the foregoing process, the performing an RRM measurement on a cell whose TDD uplink-downlink configuration identifier is 0 by using a preset measurement period includes the following five manners:

In a first manner, a minimum requirement, which is shown in Table 4, for eIMTA (specific to the TDD UL-DL configuration 0) is defined in a standard protocol, and improvements are shown in columns entitled "Number of uplink/downlink subframes per half frame" and "Inter-frequency measurement period of an LTE time division duplex system" in Table 4.

TABLE 4

| Configuration | Measurement bandwidth [RB] | Number of uplink/downlink subframes per half frame (5 ms) | | Downlink pilot timeslot (DwPTS) | | Inter-frequency measurement period of an LTE time division duplex system |
| --- | --- | --- | --- | --- | --- | --- |
| | | DL | UL | Normal CP | Extended CP | ($T_{Measurement\_Period\_TDD\_Inter}$ [ms]) |
| 0 | 6 | 1 | 3 | $19760 \cdot T_s$ | $20480 \cdot T_s$ | $480 \times N_{freq}$ |
| 1 (Note 1) | 50 | 1 | 3 | $19760 \cdot T_s$ | $20480 \cdot T_s$ | $480 \times N_{freq}$ |

Note 1:
This configuration is optional

Note 2:
$T_s$ is defined in 3GPP TS 36.211 [16]

In a second manner, a minimum requirement, which is shown in Table 5, for eIMTA (specific to the TDD UL-DL configuration 0) is defined in a standard protocol, and improvements are shown in columns entitled "Number of uplink/downlink subframes per half frame" and "Inter-frequency measurement period of an LTE time division duplex system" in Table 5.

TABLE 5

| Configuration | Measurement bandwidth [RB] | Number of uplink/downlink subframes per half frame (5 ms) | | Downlink pilot timeslot (DwPTS) | | Inter-frequency measurement period of an LTE time division duplex system ($T_{Measurement\_Period\_TDD\_Inter}$ [ms]) |
|---|---|---|---|---|---|---|
| | | DL | UL | Normal CP | Extended CP | |
| 0 | 6 | 1 | 3 | $19760 \cdot T_s$ | $20480 \cdot T_s$ | $640 \times N_{freq}$ |
| 1 (Note 1) | 50 | 1 | 3 | $19760 \cdot T_s$ | $20480 \cdot T_s$ | $480 \times N_{freq}$ |

Note 1:
This configuration is optional
Note 2:
$T_s$ is defined in 3GPP TS 36.211 [16]

In a third manner, a minimum requirement, which is shown in Table 6, for eIMTA (specific to the TDD UL-DL configuration 0) is defined in a standard protocol, and improvements are shown in columns entitled "Number of uplink/downlink subframes per half frame" and "Inter-frequency measurement period of an LTE time division duplex system" in Table 6.

TABLE 6

| Configuration | Measurement bandwidth [RB] | Number of uplink/downlink subframes per half frame (5 ms) | | Downlink pilot timeslot (DwPTS) | | Inter-frequency measurement period of an LTE time division duplex system ($T_{Measurement\_Period\_TDD\_Inter}$ [ms]) |
|---|---|---|---|---|---|---|
| | | DL | UL | Normal CP | Extended CP | |
| 0 | 6 | 1 | 3 | $19760 \cdot T_s$ | $20480 \cdot T_s$ | $720 \times N_{freq}$ |
| 1 (Note 1) | 50 | 1 | 3 | $19760 \cdot T_s$ | $20480 \cdot T_s$ | $480 \times N_{freq}$ |

Note 1:
This configuration is optional
Note 2:
$T_s$ is defined in 3GPP TS 36.211 [16]

In a fourth manner, a minimum requirement, which is shown in Table 7, for eIMTA (specific to the TDD UL-DL configuration 0) is defined in a standard protocol, and improvements are shown in columns entitled "Number of uplink/downlink subframes per half frame" and "Inter-frequency measurement period of an LTE time division duplex system" in Table 7.

TABLE 7

| Configuration | Measurement bandwidth [RB] | Number of uplink/downlink subframes per half frame (5 ms) | | Downlink pilot timeslot (DwPTS) | | Inter-frequency measurement period of an LTE time division duplex system ($T_{Measurement\_Period\_TDD\_Inter}$ [ms]) |
|---|---|---|---|---|---|---|
| | | DL | UL | Normal CP | Extended CP | |
| 0 | 6 | 1 | 3 | $19760 \cdot T_s$ | $20480 \cdot T_s$ | $960 \times N_{freq}$ |
| 1 (Note 1) | 50 | 1 | 3 | $19760 \cdot T_s$ | $20480 \cdot T_s$ | $480 \times N_{freq}$ |

Note 1:
This configuration is optional
Note 2:
$T_s$ is defined in 3GPP TS 36.211 [16]

In a fifth manner, a minimum requirement, which is shown in Table 8, for eIMTA (specific to the TDD UL-DL configuration 0) is defined in a standard protocol, and improvements are shown in columns entitled "Number of uplink/downlink subframes per half frame," "Downlink pilot timeslot," and "Inter-frequency measurement period of an LTE time division duplex system" in Table 8.

TABLE 8

| Configuration | Measurement bandwidth [RB] | Number of uplink/downlink subframes per half frame (5 ms) | | Downlink pilot timeslot (DwPTS) | | Inter-frequency measurement period of an LTE time division duplex system ($T_{Measurement\_Period\_TDD\_Inter}$ [ms]) |
|---|---|---|---|---|---|---|
| | | DL | UL | Normal CP | Extended CP | |
| 0 | 6 | 1 | 3 | | | 720 × $N_{freq}$ |
| 1 (Note 1) | 50 | 1 | 3 | | | 720 × $N_{freq}$ |

Note 1:
This configuration is optional
Note 2:
$T_s$ is defined in 3GPP TS 36.211 [16]

As can be seen, in a process of an inter-frequency measurement or an inter-RAT measurement, when a measurement bandwidth is six radio resource blocks (6 RBs), for an inter-frequency or inter-system frequency channel number, a preset measurement period is greater than 480 milliseconds and less than 960 milliseconds; or when a measurement bandwidth is 50 RBs, for an inter-frequency or inter-system frequency channel number, a preset measurement period is greater than 240 milliseconds and less than 720 milliseconds. By means of the foregoing technical solution, by prolonging duration of a measurement period, it is ensured that the UE can obtain a sufficient quantity of downlink subframes within the measurement period, thereby ensuring a quantity of samples obtained during an RRM measurement and accuracy of an RRM measurement result.

Implementation Manner 3

In this embodiment of the present disclosure, because a TDD uplink-downlink configuration 0 includes only one downlink subframe in every 5 milliseconds, there are the following three manners to ensure to obtain, in current 480 ms, a same quantity of downlink subframes as another TDD uplink-downlink configuration identifier:

In a first manner, a measurement Gap length remains unchanged, that is, maintains 6 ms; and a Gap repetition period is shortened, for example, an original Gap repetition period is shortened from 40 ms to 20 ms. Refer to the last row in Table 9.

TABLE 9

| Gap Pattern ID | Measurement Gap Length (MGL, ms) | Measurement Gap Repetition Period (MGRP, ms) | Minimum available time for inter-frequency or inter-RAT measurements during 480 ms period (Tinter1, ms)) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 6 | 20 | 120 | Only for Inter-Frequency E-UTRAN TDD |

In Table 9, the preset measurement Gap repetition period is greater than 10 milliseconds and is less than 40 milliseconds, and preferably, the preset measurement Gap repetition period is 20 milliseconds. Considering power conservation and a design characteristic of an LTE system, preferably, the Gap repetition period is 20 ms.

In a second manner, a measurement Gap length is prolonged, and a Gap repetition period remains unchanged. For example, the measurement Gap length is increased to 11 ms from current 6 ms, and the Gap repetition period maintains 40 ms (Gap Pattern 0) or 80 ms (Gap Pattern 1). Refer to the last row in Table 10.

TABLE 10

| Gap Pattern ID | Measurement Gap Length (MGL, ms) | Measurement Gap Repetition Period (MGRP, ms) | Minimum available time for inter-frequency or inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 11 | 40 | 120 | Only for Inter-Frequency E-UTRAN TDD |

In Table 10, considering accuracy of an RRM measurement result, the Gap repetition period needs to be as short as possible. If the Gap repetition period remains unchanged, the preset measurement Gap length is greater than 6 milliseconds and is less than 16 milliseconds, and preferably, a Gap repetition period of 40 ms is selected, and in this case, the measurement Gap length may be increased to 11 ms.

In a third manner, a Gap repetition period is shortened, and a measurement Gap length is prolonged. For example, the measurement Gap length is increased to 11 ms from current 6 ms, and an original Gap repetition period is shortened from 40 ms to 20 ms.

In view of rationality of standards, the first manner is optimal, and the second manner is less optimal. An original network configuration Gap length is 6 ms, which ensures an opportunity of detecting a PSS (primary synchronization signal)/an SSS (secondary synchronization signal) once; and the original Gap repetition period is 40 ms (Gap Pattern 0) or 80 ms (Gap Pattern 1). Refer to the last row in Table 11.

TABLE 11

| Gap Pattern ID | Measurement Gap Length (MGL, ms) | Measurement Gap Repetition Period (MGRP, ms) | Minimum available time for inter-frequency or inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 11 | 20 | 240 | Only for Inter-Frequency E-UTRAN TDD |

Implementation Manner 4

Currently, in TS 36.133, a requirement on accuracy of an RRM inter-frequency measurement result is shown in Table 12 and Table 13, where Table 12 shows RSRP inter-frequency absolute accuracy (reference signal received power inter-frequency absolute accuracy), and Table 13 shows RSRP inter-frequency relative accuracy (reference signal received power inter-frequency relative accuracy).

TABLE 12

RSRP inter-frequency absolute accuracy

| Accuracy | | Signal-to-noise ratio ($\hat{E}s/Iot$) dB | Conditions | | | |
|---|---|---|---|---|---|---|
| | | | | Io range (Io $^{Note\ 1}$ range) | | |
| Normal condition dB | Extreme condition dB | | Evolved UMTS Terrestrial Radio Access system operating frequency band groups (E-UTRA operating band groups $^{Note\ 3}$) | Minimum Io dBm/15 kHz $^{Note\ 2}$ | Maximum Io dBm/BW$_{Channel}$ | dBm/BW$_{Channel}$ |
| ±6 | ±9 | ≥−6 dB | FDD_A, TDD_A | −121 | N/A | −70 |
| | | | FDD_C, TDD_C | −120 | N/A | −70 |
| | | | FDD_D | −119.5 | N/A | −70 |
| | | | FDD_E, TDD_E | −119 | N/A | −70 |
| | | | FDD_F | −118.5 | N/A | −70 |
| | | | FDD_G | −118 | N/A | −70 |
| | | | FDD_H | −117.5 | N/A | −70 |
| | | | FDD_N | −114.5 | N/A | −70 |
| ±8 | ±11 | ≥−6 dB | FDD_A, TDD_A, FDD_C, TDD_C, FDD_D, FDD_E, TDD_E, FDD_F, FDD_G, FDD_H, FDD_N | N/A | −70 | −50 |

NOTE 1
Io is assumed to have constant EPRE across the bandwidth.

NOTE 2
The condition level is increased by Δ > 0, when applicable, as described in Sections B.4.2 and B.4.3.

NOTE 3
E-UTRA operating band groups are as defined in Section 3.5.

TABLE 13

RSRP inter-frequency relative accuracy

| Accuracy | | Signal-to-noise ratio ($\hat{E}s/Iot$ $^{Note\ 2}$) dB | Conditions | | |
|---|---|---|---|---|---|
| | | | | Io range (Io $^{Note\ 1}$ range) | |
| Normal condition dB | Extreme condition dB | | Evolved UMTS Terrestrial Radio Access system operating frequency band groups (E-UTRA operating band groups $^{Note\ 4}$) | Minimum Io dBm/15 kHz $^{Note\ 3}$ | Maximum Io dBm/BW$_{Channel}$ |
| ±6 | ±6 | ≥−6 dB | FDD_A, TDD_A | −121 | −50 |
| | | | FDD_C, TDD_C | −120 | −50 |
| | | | FDD_D | −119.5 | −50 |
| | | | FDD_E, TDD_E | −119 | −50 |
| | | | FDD_F | −118.5 | −50 |
| | | | FDD_G | −118 | −50 |
| | | | FDD_H | −117.5 | −50 |
| | | | FDD_N | −114.5 | −50 |

NOTE 1
Io is assumed to have constant EPRE across the bandwidth.

NOTE 2
The parameter $\hat{E}s/Iot$ is the minimum $\hat{E}s/Iot$ of the pair of cells to which the requirement applies.

NOTE 3
The condition level is increased by Δ > 0, when applicable, as described in Sections B.4.2 and B.4.3.

NOTE 4
E-UTRA operating band groups are as defined in Section 3.5.

In this embodiment of the present disclosure, an RRM measurement is performed on a cell whose TDD uplink-downlink configuration identifier is 0 based on a new RRM measurement requirement, which is specifically an improvement in a search boundary condition, or a reduction in measurement accuracy. Preferably, an RRM measurement is performed on the cell whose TDD uplink-downlink configuration identifier is 0 according to an improved search boundary condition, which is specifically:

In a first manner, a preset cell search boundary parameter is changed from −6 dB into −4 dB, that is, the preset cell search boundary condition is made to be consistent with a current inter-frequency cell search boundary condition. Refer to column entitled "Signal-to-noise ratio (Ês/Iot)" in Table 14 and to the column entitled "Signal-to-noise ratio (Ês/Iot[Note 2])" in Table 15.

TABLE 14

RSRP inter-frequency absolute accuracy for eIMTA

| Accuracy | | | Conditions | | | |
|---|---|---|---|---|---|---|
| | | | | (Io[Note 1] range) | | |
| Normal condition | Extreme condition | Signal-to-noise ratio (Ês/Iot) | Evolved UMTS Terrestrial Radio Access system operating frequency band groups (E-UTRA operating band groups[Note 3]) | Minimum Io | | Maximum Io |
| dB | dB | dB | | dBm/15 kHz[Note 2] | dBm/BW$_{Channel}$ | dBm/BW$_{Channel}$ |
| ±6 | ±9 | ≥−4 dB | FDD_A, TDD_A | −121 | N/A | −70 |
| | | | FDD_C, TDD_C | −120 | N/A | −70 |
| | | | FDD_D | −119.5 | N/A | −70 |
| | | | FDD_E, TDD_E | −119 | N/A | −70 |
| | | | FDD_F | −118.5 | N/A | −70 |
| | | | FDD_G | −118 | N/A | −70 |
| | | | FDD_H | −117.5 | N/A | −70 |
| | | | FDD_N | −114.5 | N/A | −70 |
| ±8 | ±11 | ≥−4 dB | FDD_A, TDD_A, FDD_C, TDD_C, FDD_D, FDD_E, TDD_E, FDD_F, FDD_G, FDD_H, FDD_N | N/A | −70 | −50 |

NOTE [1]Io is assumed to have constant EPRE across the bandwidth.
NOTE [2]The condition level is increased by Δ > 0, when applicable, as described in Sections B.4.2 and B.4.3.
NOTE [3]E-UTRA operating band groups are as defined in Section 3.5.

TABLE 15

RSRP inter-frequency relative accuracy for eIMTA

| Accuracy | | | Condition | | |
|---|---|---|---|---|---|
| | | | | Io range (Io[Note 1] range) | |
| Normal condition dB | Extreme condition dB | Signal-to-noise ratio (Ês/Iot[Note 2]) dB | Evolved UMTS Terrestrial Radio Access system operating frequency band groups (E-UTRA operating band groups[Note 4]) | Minimum Io dBm/15 kHz[Note 3] | Maximum Io dBm/BW$_{Channel}$ |
| ±6 | ±6 | ≥−4 dB | FDD_A, TDD_A | −121 | −50 |
| | | | FDD_C, TDD_C | −120 | −50 |
| | | | FDD_D | −119.5 | −50 |
| | | | FDD_E, TDD_E | −119 | −50 |
| | | | FDD_F | −118.5 | −50 |

TABLE 15-continued

RSRP inter-frequency relative accuracy for eIMTA

| Accuracy | | | Condition | | |
|---|---|---|---|---|---|
| | | | | Io range (Io[Note 1] range) | |
| Normal condition dB | Extreme condition dB | Signal-to-noise ratio (Ês/Iot[Note 2]) dB | Evolved UMTS Terrestrial Radio Access system operating frequency band groups (E-UTRA operating band groups[Note 4]) | Minimum Io dBm/15 kHz[Note 3] | Maximum Io dBm/BW$_{Channel}$ |
| | | | FDD_G | −118 | −50 |
| | | | FDD_H | −117.5 | −50 |
| | | | FDD_N | −114.5 | −50 |

NOTE [1] Io is assumed to have constant EPRE across the bandwidth.
NOTE [2] The parameter Ês/Iot is the minimum Ês/Iot of the pair of cells to which the requirement applies.
NOTE [3] The condition level is increased by Δ > 0, when applicable, as described in Sections B.4.2 and B.4.3.
NOTE [4] E-UTRA operating band groups are as defined in Section 3.5.

In a second manner, a preset cell search boundary parameter is changed from −6 dB into −3 dB, increased by 3 dB, to ensure measurement accuracy of the TDD UL-DL configuration 0 at a high signal-to-noise ratio. Refer to the column entitled "Signal-to-noise ratio (Ês/Iot)" in Table 16 and to the column entitled "Signal-to-noise ratio (Ês/Iot[Note 2])" in Table 17.

TABLE 16

RSRP inter-frequency absolute accuracy for eIMTA

| Accuracy | | | Conditions | | | |
|---|---|---|---|---|---|---|
| | | | | Io range (Io[Note 1] range) | | |
| Normal condition dB | Extreme condition dB | Signal-to-noise ratio (Ês/Iot) dB | Evolved UMTS Terrestrial Radio Access system operating frequency band groups (E-UTRA operating band groups[Note 3]) | Minimum Io dBm/15 kHz[Note 2] | dBm/BW$_{Channel}$ | Maximum Io dBm/BW$_{Channel}$ |
| ±6 | ±9 | ≥−3 dB | FDD_A, TDD_A | −121 | N/A | −70 |
| | | | FDD_C, TDD_C | −120 | N/A | −70 |
| | | | FDD_D | −119.5 | N/A | −70 |
| | | | FDD_E, TDD_E | −119 | N/A | −70 |
| | | | FDD_F | −118.5 | N/A | −70 |
| | | | FDD_G | −118 | N/A | −70 |
| | | | FDD_H | −117.5 | N/A | −70 |
| | | | FDD_N | −114.5 | N/A | −70 |
| ±8 | ±11 | ≥−3 dB | FDD_A, TDD_A, FDD_C, TDD_C, FDD_D, FDD_E, TDD_E, FDD_F, FDD_G, FDD_H, FDD_N | N/A | −70 | −50 |

NOTE [1] Io is assumed to have constant EPRE across the bandwidth.
NOTE [2] The condition level is increased by Δ > 0, when applicable, as described in Sections B.4.2 and B.4.3.
NOTE [3] E-UTRA operating band groups are as defined in Section 3.5.

TABLE 17

RSRP inter-frequency relative accuracy for eIMTA

| Accuracy | | | Conditions | | |
|---|---|---|---|---|---|
| | | | | Io range (Io[Note 1] range) | |
| Normal condition dB | Extreme condition dB | Signal-to-noise ratio ($\hat{E}s/Iot$[Note 2]) dB | Evolved UMTS Terrestrial Radio Access system operating frequency band groups (E-UTRA operating band groups[Note 4]) | Minimum Io dBm/15 kHz[Note 3] | Maximum Io dBm/BW$_{Channel}$ |
| ±6 | ±6 | ≥−3 dB | FDD_A, TDD_A | −121 | −50 |
| | | | FDD_C, TDD_C | −120 | −50 |
| | | | FDD_D | −119.5 | −50 |
| | | | FDD_E, TDD_E | −119 | −50 |
| | | | FDD_F | −118.5 | −50 |
| | | | FDD_G | −118 | −50 |
| | | | FDD_H | −117.5 | −50 |
| | | | FDD_N | −114.5 | −50 |

NOTE [1]Io is assumed to have constant EPRE across the bandwidth.
NOTE [2]The parameter $\hat{E}s/Iot$ is the minimum $\hat{E}s/Iot$ of the pair of cells to which the requirement applies.
NOTE [3]The condition level is increased by Δ > 0, when applicable, as described in Sections B.4.2 and B.4.3.
NOTE [4]E-UTRA operating band groups are as defined in Section 3.5.

As can be seen, the foregoing preset cell search boundary parameter is greater than −6 dB. By means of the foregoing technical solution, by changing a search boundary condition of an existing standard, RRM measurement accuracy is ensured while an RRM measurement on a cell whose TDD uplink-downlink configuration identifier is 0 is implemented.

Figure 6:
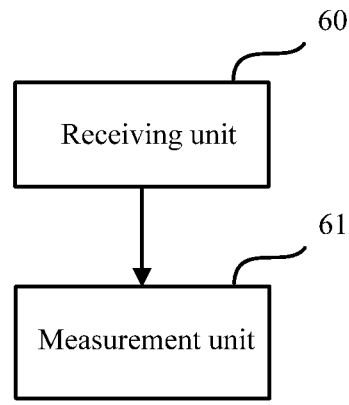
FIG. 6 is a schematic structural diagram 1 of an RRM measurement apparatus according to an embodiment of the present disclosure.

Based on the foregoing technical solutions, referring to FIG. 6, the present disclosure further provides an RRM measurement apparatus in a TDD system, including a receiving unit 60 and a measurement unit 61, where the receiving unit 60 is configured to receive an RRM measurement message delivered by a network device, and send the RRM measurement message to the measurement unit; and the measurement unit 61 is configured to receive the RRM measurement message sent by the receiving unit 60, and perform an RRM measurement on a cell whose TDD uplink-downlink configuration identifier is 0 in an RRM measurement manner that corresponds to measurement indication information carried in the received RRM measurement message.

Figure 7:
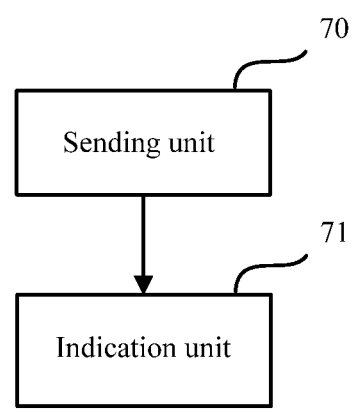
FIG. 7 is a schematic structural diagram 2 of an RRM measurement apparatus according to an embodiment of the present disclosure.

Referring to FIG. 7, the present disclosure further provides an RRM measurement apparatus in a TDD system, including a sending unit 70 and an indication unit 71, where the sending unit 70 is configured to send an RRM measurement message to UE; and the indication unit 71 is configured to instruct the UE to perform, in an RRM measurement manner that corresponds to measurement indication information carried in the RRM measurement message, an RRM measurement on a cell whose TDD uplink-downlink configuration identifier is 0.

Figure 8:
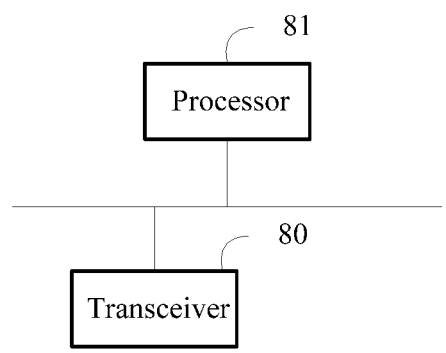
FIG. 8 is a schematic structural diagram of a UE device according to an embodiment of the present disclosure.

Based on the foregoing technical solutions, referring to FIG. 8, the present disclosure further provides UE, including a transceiver 80 and a processor 81, where the transceiver 80 is configured to receive an RRM measurement message delivered by a network device, and send the RRM measurement message to the processor 81; and the processor 81 is configured to receive the RRM measurement message sent by the transceiver 80, and perform an RRM measurement on a cell whose TDD uplink-downlink configuration identifier is 0 in an RRM measurement manner that corresponds to measurement indication information carried in the received RRM measurement message.

Optionally, the processor 81 is configured to: when the measurement indication information carried in the RRM measurement message is bandwidth measurement indication information, perform an RRM measurement on the cell whose TDD uplink-downlink configuration identifier is 0 by using a preset measurement bandwidth, where the preset measurement bandwidth is greater than a preset threshold; or when the measurement indication information carried in the RRM measurement message is period measurement indication information, perform an RRM measurement on the cell whose TDD uplink-downlink configuration identifier is 0 by using a preset measurement period.

Optionally, the processor 81 is configured to: when the measurement indication information carried in the RRM measurement message is the period measurement indication information, if a measurement bandwidth is six radio resource blocks RBs, use a preset measurement period greater than 480 milliseconds and less than 960 milliseconds; or if a measurement bandwidth is 50 RBs, use a preset measurement period greater than 240 milliseconds and less than 720 milliseconds.

Optionally, the processor 81 is configured to: if the measurement bandwidth is 6 RBs, use a preset measurement period of 720 milliseconds; or if the measurement bandwidth is 50 RBs, use a preset measurement period of 480 milliseconds.

The apparatus in this embodiment may be configured to execute the technical solutions in the method embodiments shown in Table 4 to Table 8, and their implementation principles and technical solutions are similar, which are not described in detail herein again.

Optionally, the transceiver 80 is configured to: when the measurement indication information carried in the RRM measurement message is the bandwidth measurement indication information, receive an explicit RRM measurement message delivered by the network device, where the explicit RRM measurement message carries TDD interference management and traffic adaptation eIMTA indication information and a bandwidth measurement indication, or receive an implicit RRM measurement message delivered by the network device, where the implicit RRM measurement message carries eIMTA indication information.

Optionally, the processor 81 is configured to: when the RRM measurement message is the explicit RRM measurement message, obtain, according to the eIMTA indication information, an identifier of the cell whose TDD uplink-downlink configuration identifier is 0, and obtain bandwidth measurement indication information according to the bandwidth measurement indication; or when the RRM measurement message is the implicit RRM measurement message, obtain identifier information that is included in the eIMTA indication information carried in the implicit RRM measurement message, and obtain, according to the identifier information, bandwidth measurement indication information corresponding to the identifier information and an identifier of the cell whose TDD uplink-downlink configuration identifier is 0.

Optionally, the processor 81 is configured to perform an RRM measurement on the cell whose TDD uplink-downlink configuration identifier is 0 by using a preset measurement Gap repetition period according to the measurement indication information; or perform an RRM measurement on the cell whose TDD uplink-downlink configuration identifier is 0 by using a preset measurement Gap length according to the measurement indication information; or perform an RRM measurement on the cell whose TDD uplink-downlink configuration identifier is 0 by using a preset cell search boundary parameter.

Optionally, the processor 81 is configured to perform an RRM measurement on the cell whose TDD uplink-downlink configuration identifier is 0 by using the preset measurement Gap repetition period greater than 10 milliseconds and less than 40 milliseconds.

Optionally, the processor 81 is configured to perform an RRM measurement on the cell whose TDD uplink-downlink configuration identifier is 0 by using the preset measurement Gap repetition period of 20 milliseconds.

The apparatus in this embodiment may be configured to execute the technical solution in the method embodiment shown in Table 9, and their implementation principles and technical solutions are similar, which are not described in detail herein again.

Optionally, the processor 81 is configured to perform an RRM measurement on the cell whose TDD uplink-downlink configuration identifier is 0 by using the preset measurement Gap length greater than 6 milliseconds and less than 16 milliseconds.

Optionally, the processor 81 is configured to perform an RRM measurement on the cell whose TDD uplink-downlink configuration identifier is 0 by using the preset measurement Gap length of 11 milliseconds.

The apparatus in this embodiment may be configured to execute the technical solution in the method embodiment shown in Table 10, and their implementation principles and technical solutions are similar, which are not described in detail herein again.

Optionally, the processor 81 is configured to perform an RRM measurement on the cell whose TDD uplink-downlink configuration identifier is 0 by using a preset cell search boundary parameter greater than −6 dB.

Optionally, the processor 81 is configured to perform an RRM measurement on the cell whose TDD uplink-downlink configuration identifier is 0 by using the preset cell search boundary parameter of −3 dB.

The apparatus in this embodiment may be configured to execute the technical solutions in the method embodiments shown in Table 12 to Table 17, and their implementation principles and technical solutions are similar, which are not described in detail herein again.

In the foregoing process, the transceiver 80 is equivalent to the receiving unit 60 shown in FIG. 6, and the processor 81 is equivalent to the measurement unit 61 shown in FIG. 6.

Figure 9:
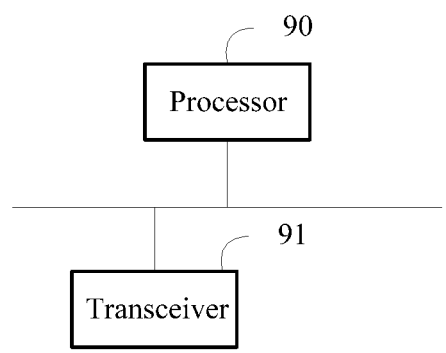
FIG. 9 is a schematic structural diagram of a network device according to an embodiment of the present disclosure.

Referring to FIG. 9, the present disclosure further provides a network device, including a processor 90 and a transceiver 91, where the processor 90 is configured to generate an RRM measurement message, and send the generated RRM measurement message to the transceiver 91;

the transceiver 91 is configured to receive the RRM measurement message sent by the processor 90, and send the RRM measurement message to UE; and the processor 90 is configured to instruct the UE to perform, in an RRM measurement manner that corresponds to measurement indication information carried in the RRM measurement message, an RRM measurement on a cell whose TDD uplink-downlink configuration identifier is 0.

Optionally, the processor 90 is configured to generate an RRM measurement message carrying bandwidth measurement indication information, or generate an RRM measurement message carrying period measurement indication information.

Optionally, the transceiver 91 is configured to send, to the UE, the RRM measurement message carrying the bandwidth measurement indication information, or send, to the UE, the RRM measurement message carrying the period measurement indication information.

Optionally, the processor 90 is configured to generate an explicit RRM measurement message, or generate an implicit RRM measurement message.

Optionally, the transceiver 91 is configured to send the explicit RRM measurement message to the UE, where the explicit RRM measurement message carries eIMTA indication information and a bandwidth measurement indication; or send the implicit RRM measurement message to the UE, where the implicit RRM measurement message carries eIMTA indication information.

In the foregoing process, the processor 90 is equivalent to the indication unit 71 shown in FIG. 7, and the transceiver 91 is equivalent to the sending unit 70 shown in FIG. 7.

To sum up, in this embodiment of the present disclosure, UE performs an RRM measurement on a cell whose TDD uplink-downlink configuration identifier is 0 by using a corresponding RRM measurement method according to measurement indication information that is carried in an RRM measurement message delivered by a network device. By means of the technical solutions in the present disclosure, UE can perform an RRM measurement on a cell whose TDD uplink-downlink configuration identifier is 0 by using an RRM measurement method.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A radio resource management (RRM) measurement method in a time division duplex (TDD) system, comprising:
   receiving, by user equipment (UE), an RRM measurement message from a network device; and
   performing, by the UE, an RRM measurement on a cell whose TDD uplink-downlink configuration identifier is 0 in an RRM measurement manner that corresponds to measurement indication information carried in the received RRM measurement message, wherein when the measurement indication information carried in the RRM measurement message is period measurement indication information,
   when a measurement bandwidth is six radio resource blocks RBs, the used preset measurement period is greater than 480 milliseconds and is less than 960 milliseconds; or
   when a measurement bandwidth is 50 RBs, the used preset measurement period is greater than 240 milliseconds and is less than 720 milliseconds.

2. The method according to claim 1, wherein the performing the RRM measurement on the cell whose TDD uplink-downlink configuration identifier is 0 in the RRM measurement manner that corresponds to measurement indication information carried in the RRM measurement message comprises:
   when the measurement indication information carried in the RRM measurement message is the period measurement indication information, performing an RRM measurement on the cell whose TDD uplink-downlink configuration identifier is 0 by using a preset measurement period.

3. The method according to claim 1, wherein
   when the measurement bandwidth is 6 RBs, the used preset measurement period is 720 milliseconds; or
   when the measurement bandwidth is 50 RBs, the used preset measurement period is 480 milliseconds.

4. A radio resource management (RRM) measurement apparatus in a time division duplex (TDD) system, comprising:
   a receiver, configured to receive an RRM measurement message delivered by a network device, and send the RRM measurement message; and
   a processor, configured to receive the RRM measurement message sent by the receiver, and perform an RRM measurement on a cell whose TDD uplink-downlink configuration identifier is 0 in an RRM measurement manner that corresponds to measurement indication information carried in the received RRM measurement message, wherein the processor is configured to:
   when the measurement indication information carried in the RRM measurement message is period measurement indication information,
   when a measurement bandwidth is six radio resource blocks RBs, use a preset measurement period greater than 480 milliseconds and less than 960 milliseconds; or
   when a measurement bandwidth is 50 RBs, use a preset measurement period greater than 240 milliseconds and less than 720 milliseconds.

5. The apparatus according to claim 4, wherein the processor is configured to:
   when the measurement indication information carried in the RRM measurement message is the period measurement indication information, perform an RRM measurement on the cell whose TDD uplink-downlink configuration identifier is 0 by using a preset measurement period.

6. The apparatus according to claim 4, wherein the processor is configured to:
   when the measurement bandwidth is 6 radio resource blocks RBs, use a preset measurement period of 720 milliseconds; or
   when the measurement bandwidth is 50 RBs, use a preset measurement period of 480 milliseconds.

7. The apparatus according to claim 4, wherein the processor is configured to:
   perform an RRM measurement on the cell whose TDD uplink-downlink configuration identifier is 0 by using a preset measurement Gap repetition period according to the measurement indication information, wherein the preset measurement Gap repetition period is greater than 10 milliseconds and is less than 40 milliseconds; or perform an RRM measurement on the cell whose TDD uplink-downlink configuration identifier is 0 by using a preset measurement Gap length according to the measurement indication information, wherein the preset measurement Gap length is greater than 6 milliseconds and is less than 16 milliseconds; or perform an RRM measurement on the cell whose TDD uplink-downlink configuration identifier is 0 by using a preset cell search boundary parameter, wherein the preset cell search boundary parameter is greater than −6 dB.

8. The apparatus according to claim 7, wherein the processor is configured to perform an RRM measurement on the cell whose TDD uplink-downlink configuration identifier is 0 by using a preset measurement Gap repetition period according to the measurement indication information, wherein the preset measurement Gap repetition period is 20 milliseconds; or perform an RRM measurement on the cell whose TDD uplink-downlink configuration identifier is 0 by using a preset measurement Gap length according to the measurement indication information, wherein the preset measurement Gap length is 11 milliseconds; or perform an RRM measurement on the cell whose TDD uplink-downlink configuration identifier is 0 by using a preset cell search boundary parameter, wherein the preset cell search boundary parameter is −3 dB.

9. A radio resource management (RRM) measurement apparatus in a time division duplex (TDD) system, comprising:
   a sender, configured to send an RRM measurement message to user equipment (UE); and
   a processor, configured to instruct the UE to perform, in an RRM measurement manner that corresponds to measurement indication information carried in the RRM measurement message, an RRM measurement on a cell whose TDD uplink-downlink configuration identifier is 0, wherein when a measurement bandwidth is six radio resource blocks RBs, a preset measurement period for the UE is greater than 480 milliseconds and is less than 960 milliseconds; or when a measurement bandwidth is 50 RBs, the preset measurement period is greater than 240 milliseconds and is less than 720 milliseconds.

10. The apparatus according to claim 9, wherein the sender is configured to:

send, to the UE, an RRM measurement message carrying period measurement indication information.

11. The apparatus according to claim 9, wherein when the measurement bandwidth is 6 RBs, the preset measurement period is 720 milliseconds; or when the measurement bandwidth is 50 RBs, the preset measurement period is 480 milliseconds.

* * * * *